US007241434B2

(12) United States Patent
Anthony et al.

(10) Patent No.: US 7,241,434 B2
(45) Date of Patent: *Jul. 10, 2007

(54) HIGH PRESSURE AND HIGH TEMPERATURE PRODUCTION OF DIAMONDS

(75) Inventors: Thomas R. Anthony, Schenectady, NY (US); Yavuz Kadioglu, Clifton Park, NY (US); Suresh S. Vagarali, Columbus, OH (US); Steven W. Webb, Worthington, OH (US); William E. Jackson, Solon, OH (US); William F. Banholzer, Niskayuna, NY (US); John K. Casey, Dublin (IE); Alan C. Smith, Dublin (IE)

(73) Assignee: Bellataire International, LLC, Worthington, OH (US)

( * ) Notice: Subject to any disclaimer, the term of this patent is extended or adjusted under 35 U.S.C. 154(b) by 416 days.

This patent is subject to a terminal disclaimer.

(21) Appl. No.: 10/344,249

(22) PCT Filed: Aug. 8, 2001

(86) PCT No.: PCT/US01/24707

§ 371 (c)(1),
(2), (4) Date: Mar. 28, 2003

(87) PCT Pub. No.: WO02/13958

PCT Pub. Date: Feb. 21, 2002

(65) Prior Publication Data
US 2005/0260935 A1    Nov. 24, 2005

(51) Int. Cl.
*C01B 31/06* (2006.01)
(52) U.S. Cl. .................. 423/446; 117/929; 423/264
(58) Field of Classification Search ................ 423/446, 423/264; 117/929
See application file for complete search history.

(56) References Cited

U.S. PATENT DOCUMENTS

| 3,134,739 | A |   | 5/1964  | Cannon            |         |
|-----------|---|---|---------|-------------------|---------|
| 3,135,007 | A |   | 6/1964  | Howell            |         |
| 3,141,855 | A | * | 7/1964  | Wentorf, Jr.      | 252/502 |
| 3,401,019 | A |   | 9/1968  | Cowan et al.      |         |
| 3,609,818 | A | * | 10/1971 | Wentorf           | 425/77  |
| 4,124,690 | A |   | 11/1978 | Strong et al.     |         |
| 4,174,380 | A |   | 11/1979 | Strong et al.     |         |
| 4,399,364 | A |   | 8/1983  | Evans et al.      |         |
| 6,692,714 | B2| * | 2/2004  | Vagarali et al.   | 423/264 |

FOREIGN PATENT DOCUMENTS

| EP | 0 324 179 |   | 7/1989  |         |
|----|-----------|---|---------|---------|
| EP | 0 671 482 |   | 9/1995  |         |
| FR | 1316489   | * | 12/1962 | 423/446 |
| WO | WO 01/14050 |  | 3/2001 |         |

OTHER PUBLICATIONS

Fritsch, E.: The Nature of Color in Diamonds. In: Harlow, G. E. (Ed.): The Nature of Diamonds, Cambridge University Press (1998), pp. 23-47.
Orlov, Y. L.: The Mineralogy of the Diamond, John Wiley & Sons (1977), pp. 144-145.
Nikitin, A. V. et al.: Soviet Physics—Doklady, "The Effect of Heat and Pressure on Certain Physical Properties of Diamonds," vol. 13 (1969) pp. 842-844.
Evans, T. and Rainey, P.: Proc. R. Soc. Lond. A., "Changes in the defect structure of diamonds due to high temperature+high pressure treatment," vol. 344 (1975), pp. 111-130.
Chrenko, R.M. et al.: "Transformation of the state of nitrogen in diamond", Nature, vol. 270 (1977), pp. 141-144.
Brozel, M.R. et al.: Proc. R. Soc. Lond. A., "Partial dissociation of nitrogen aggregates in diamond by high temperature-high pressure treatments," vol. 361 (1978), pp. 109-127.
Evans, T. et al.: J. Phys. C: Solid State Phys., "The stages of nitrogen aggregration in diamond," vol. 14 (1981), pp. L379-L384.
Evans, T. and Qi, Z.: Proc. R. Soc. Lond. A., "The kinetics of the aggregation of nitrogen atoms in diamond," vol. 381 (1982), pp. 159-178.
Lawson, S.C. and Kanda, H.: Diamond and Related Materials, "Nickel in diamond: an annealing study," vol. 2 (1993), pp. 130-135.
Lawson, S.C. and Kanda, H.: J. Appl. Phys., "An annealing study of nickel point defects in high-pressure synthetic diamond," vol. 73 (1993), pp. 3967-3973.
Jackson, W.E. and Webb, S.W.: Mat. Res. Soc. Symp. Proc., "Synthetic diamond crystal strength enhancement through annealing at 50 kbar and 1500° C.," vol. 383 (1995), pp. 267-272.
Jackson, W.E. and Webb, S.W.: J. Mater. Res., "Synthetic Diamond Strength Enhancement Through High Pressure/High Temperature Annealing," vol. 10 (1995), pp. 1700-1709.
Schmetzer, K.: Goldschmiede Zeitung, "Behandlung natürlicher Diamanten zur Reduzierung der Gelb-oder Braunsättigung," vol. 97 (1999), pp. 47-48.
Buerki, P.R. et al.: Diamond and Related Materials, "Observation of the H2 defect in gem-quality type Ia diamond," vol. 8 (1999), pp. 1061-1066.

(Continued)

*Primary Examiner*—Stuart Hendrickson
(74) *Attorney, Agent, or Firm*—Pepper Hamilton LLP

(57) ABSTRACT

The present invention is directed to a method for treating discolored natural diamond, especially Type IIa diamond and Type IaA/B diamond with nitrogen as predominantly B centers, for improving its color. The method includes pre-blocking and preshaping a discolored natural diamond to prevent its breakage in a high pressure/high temperature (HP/HT) press, placing said discolored natural diamond in a pressure transmitting medium which is consolidated into a pill. Next, the pill is placed into a HP/HT press at elevated pressure and elevated temperature within the graphite-stable or diamond-stable range of the carbon phase diagram for a time sufficient to improve the color of said diamond. Finally, the diamond is recovered from said press. Colorless and fancy colored diamonds can be made by this method.

25 Claims, 2 Drawing Sheets

OTHER PUBLICATIONS

Gem & Gemology, "Treated-Color Yellow Diamonds With Green Graining," Lab Notes, Summer, 1997.

XP-000979984; GE POL Diamonds: Before and After; Christopher P. Smith et al.; Fall, 2000; pp. 192-214.

XP-004195517; Color changes produced in natural brown diamonds by high-pressure, high-temperature treatment; Alan T. Collins et al.

Kalinin, The Impact of High Temperatures on the Colour Characteristics of Natural Diamond with A Brown Tint, Thesis at Academy of Science of the USSR, United Institute of Geology, Geophysics and Mineralogy, Jan. 17, 1992. English Translation of Chapter 4 and 5.

* cited by examiner

HIGH PRESSURE AND HIGH TEMPERATURE PRODUCTION OF DIAMONDS

STATEMENT REGARDING FEDERALLY SPONSORED RESEARCH

Not applicable.

BACKGROUND OF THE INVENTION

The present invention generally relates to the production of gem quality diamonds (colorless and fancy colored diamond) and more particularly to the production of gem quality diamonds from inferior-grade discolored or so-called "brown" diamonds.

Diamonds are conventionally divided into four main categories which are designated as Type Ia, Type Ib, Type IIa, and Type IIb. In reality, there is a smooth change in impurity concentration/arrangement between the four types so that intermediate varieties thereof also exist. Type I diamonds contain nitrogen as the major impurity. This category is divided into Type Ia diamonds where the nitrogen exists in an agglomerated state as either pairs (Type IaA) or clusters of four nitrogen atoms (Type IaB) or mixtures thereof (Type IaA/B), and Type Ib where the nitrogen occurs as only isolated single nitrogen atoms. Some diamond also contain clusters of three nitrogen atoms called N3 centers. Over 98% of the larger clear natural diamonds are Type Ia. Type Ib diamonds are rarer and amount to only 0.8% of natural stones. Type Ia diamonds also contain platelets, which are small flat inclusions, a few atoms thick and about 300 atoms across, that may contain some nitrogen in an unspecified form. Type Ia diamonds also may contain voidites which are small equiaxed cavities that are either vacant or which contain nitrogen in an unknown form. Voidites tend to be seen principally in Type IaA/B or Type IaB diamonds.

Generally, it is believed that all nitrogen-containing diamonds started out as Type Ib with isolated nitrogen atoms that were incorporated during crystal growth. During a long period of time (perhaps up to 1 billion years), the diamonds were annealed within earth's mantel at temperatures between 1000° and 1300° C. and at high pressure. During this time, the nitrogen atoms migrated in the diamonds and principally formed two types of aggregates, namely pairs or clusters of four. It is believed that the clusters of four nitrogen atoms are formed when migrating nitrogen pairs collide with each other. Thus, the progression is believed to be Type Ib to Type IaA to Type IaA/B to Type IaB. A small amount of nitrogen may also agglomerate as N3 centers which are a planar array of three nitrogen atoms surrounding a common vacancy. It is believed that such centers are formed when an isolated nitrogen combines with a nitrogen pair during the agglomeration process. N3 centers apparently are less stable than A and B centers as their concentration in Type Ia diamonds is relatively small. Platelets form as soon as the annealing has progressed to the Type IaA stage. Voidite formation, as well as some platelet disintegration, occurs as B clusters form and becomes pronounced in the Type IaB stage of annealing.

Type II diamonds contain no nitrogen. Type II diamonds are further divided into Type IIa and Type IIb. Type IIa diamonds have no impurities. Type IIb diamonds contain boron in the parts per million range and are extremely rare.

The color of diamonds can range from clear and colorless to yellow, orange, red, blue, brown, and even green. For natural diamonds, a brownish tinge is the most common color and may occur in as many as 98% of mined natural diamonds. Type Ia diamonds containing nitrogen can be colorless if all of the nitrogen is tied up in A or B centers. However, if isolated nitrogen atoms or N3 centers are present, the diamonds will have a yellow tinge whose hue depends on the concentration of these forms of nitrogen atoms. Typically, the N3 centers produce the washed-out yellow that is referred to as "Cape Yellow", while isolated nitrogen atoms produce the richer more vibrant "Canary Yellow" if their concentration is high enough. A small amount of yellow in an otherwise colorless diamond can significantly decrease its market price. However, a rich deep yellow color can produce a "fancy" yellow that has a very high value in the marketplace.

Most Type Ia diamonds as mined are of a brownish color. A brown color can result from the mixture of many other fundamental colors. One way is to mix some yellow coloring from isolated nitrogen atoms or N3 centers with some black color, perhaps from submicroscopic inclusions of graphite. The mixture of yellow and black will produce a brown color. Another way to make a brown diamond is to mix a color center that produces a green diamond with a color center that produces a red diamond. The combination of red and green again will produce a brown color. In fact, there are an infinite number of color combinations that will produce a brown color. Thus, it is not possible to determine the color centers causing the color of a diamond by its color. However, the reverse process is unique; that is, if one knows the type and concentration of color centers in a diamond, one can predict the resulting color.

Type II diamonds vary from colorless to a deep blue color. Type IIa diamonds are most valuable when they are colorless. Excessive mechanical deformation and plastic flow are believed to cause them to have a reddish brown or pink tinge which lowers their value considerably. Many natural Type IIa diamonds have this color tinge and their value could be greatly enhanced as jewelry if they could be made colorless. Some Type IIa diamonds have a steel gray haze in them that also greatly decreases their value. Previous attempts to treat Type IIa diamonds to increase their value have failed. G. Lenzen, Diamonds and Diamond Grading, p. 207, Buttersworth, London (1983). Both neutron and electron irradiation followed by annealing caused Type IIa diamonds to turn brown, thereby greatly lowering the value of the diamonds.

Type IIb diamonds have a blue color that is imparted by the boron impurity. Because of the rarity of Type IIb diamonds and their attractive blue color, they have the highest value per carat as jewelry items.

In general, the pricing of diamonds is a sensitive function of their color. Fancy color diamonds, such as the canary yellows, blue, red, pink and green diamonds, are rare and have the highest prices. Because of their rarity, the market for them is not well organized and they are usually sold via a Sotheby's or Christie's type of auction. Brown diamonds are an exception to the fancy color diamond market. Brown diamonds are very common and in the past have been culled and used as industrial diamonds and are correspondingly inexpensive. After fancy color diamonds, colorless diamonds command the highest prices. The degree of colorlessness has a strong nonlinear effect on the price of the diamond. Even the faintest tinge of yellow can considerably reduce the price of colorless diamonds.

In view of the relative prices of fancy colors, colorless, and brown diamonds, there is a strong financial incentive to change brown diamonds to either colorless diamonds or to fancy color diamonds. Irradiation has been used frequently to change the color of such diamonds from unattractive off-colors to attractive blue, green, orange, black, and yellow colors. Electrons, neutrons, gamma rays, and alpha particles have been used to produce irradiation-produced color centers in diamond. Neutron, gamma, and electron irradiation are preferred because they produce a more uniform coloration of the diamond because of their good penetrating power. There is some danger in using neutrons since radioactive species can be produced in inclusions in diamonds by neutron activation. In addition, typical irradiation treatments only develop a superficial color confined to the outer portions of the diamond.

Essentially, all of the different types of radiation produce vacancies in diamond which are seen as the GR1 band in the visible spectrum. Absorption by the GR1 brand produces a green, blue-green, dark green, or even a black color in the diamond. Vacancy color centers can be modified by high-temperature annealing to produce colors ranging from blue to pink to red to green. Annealing can be done at temperatures as low as 600° C., because the large number of vacancies introduced by irradiation temporarily increase the mobility of nitrogen and other impurities in the diamond. Eventually, the vacancies defuse to and are absorbed by vacancy sinks, such as free surfaces, dislocations, and inclusion interfaces in the diamond. Naturally, as the vacancies disappear, their direct effect on the color of the diamond also lessens. Thus, the color gradually goes through a sequence from blue to green to brown to yellow and back to the original color of the diamond. The annealing can be stopped at any point of the annealing sequence to produce the color desired. Multiple irradiation steps and annealing steps can be done to further manipulate the color.

In recent years, people have annealed diamonds at progressively higher temperatures to try to eliminate telltale signs of irradiation in the diamond because "treated" diamonds are valued at a discount to natural diamonds. The GR1 line from the vacancy begins to disappear above 400° C. as the vacancies anneal out of the crystal. Other irradiation lines, however, persist to higher temperatures. Much of the information concerning diamond irradiation and annealing treatments is kept as trade secrets by the organizations carrying out such treatments.

An example of a possibly irradiated and heat-treated greenish-yellow diamond was reported in a recent issue of Gems & Gemology, XXXIII, pp. 136–137, (Summer, 1997). Several one carat round brilliant stones were given to the GIA laboratory for testing. From their spectroscopic studies, GIA concluded that these diamonds had been treated. In addition, they inferred that the diamonds had been irradiated and subsequently heated to above 1450° C. Although the normal irradiation signatures, such as the GR1 line at 741 nm and the H1b and H1c lines arising from a combination of irradiation and heat treatment, were absent in these two stones, the stones did have an absorption peak in the near infrared range at 985 nm. Although the detection of treated stones is more of an art than a science, it is commonly believed that diamonds that show no absorption peaks at 595 nm, 1936 nm, and 2024 mm, have "almost certainly not been treated". J. Wilks, et al., Properties and Applications of Diamonds, p. 91, Buttersworth, London (1991).

Type Ia diamonds in which N3 centers give a slight yellow tinge to the crystal have been the most commonly selected stones for irradiation and annealing treatments. Electron or neutron irradiation of these stones and a subsequent heat treatment generates H3 (Nitrogen-Vacancy-Nitrogen) and H4 (Nitrogen-Nitrogen-Vacancy-Nitrogen-Nitrogen) centers which give a pleasing amber gold color to the stones. It has been found that diamonds that do not luminesce produce more attractive colors than diamonds that luminesce. A. T. Collins, J. Gemology, XVIII, pp. 37–75 (1982). Apparently, existing color centers in the stone add to the color produced by the irradiation and heat treatment, and the resulting color is less desirable.

Changing the concentration of N3 centers not only will change the yellow color of a diamond, but can increase the actual brilliance or amount of light thrown back by the diamond. The electrons around an N3 center absorb light in the ultraviolet part of the natural light spectrum, as well as blue light in the visible spectrum. In normal daylight, about ⅓ of the energy of the light is in the form of ultraviolet radiation. If the N3 concentration is relatively high, i.e., 100 ppm, then visible blue light is strongly absorbed and the diamond will have a definite yellow color, which will lower its value. However, if the concentration of N3 centers is reduced by some treatment so that the yellow coloring disappears, the remaining N3 centers can affect the brilliance of a diamond by a two-stage process. First, an ultraviolet photon is absorbed by an N3 center. The energy is temporarily stored in the N3 center. Some of this energy leaks away in the form of phonons or lattice vibrations. After a storage time pre-determined by the half-life of the center, the N3 center will re-emit the remaining energy as light. Since some energy has been lost, the re-emitted light is no longer in the high energy ultraviolet part of the spectrum. Instead, the re-emitted light now is in the visible spectrum (the technical term for this is "ultraviolet downshifting"). Because we do not see ultraviolet light, we do not notice that it is being absorbed (an animal, like a bee that can see ultraviolet light, would see the brilliance of the diamond decreased by the absorption of ultraviolet light by N3 centers). All we see is the increased emission in the visible spectrum and, thus, the diamond now appears extraordinarily bright. Consequently, a controlled reduction of N3 centers in a Type Ia diamond by any treatment will increase the value of a diamond containing them in two ways. First, elimination of some N3 centers reduces or eliminates the yellow tinge in the diamond. Second, the remaining N3 centers will increase the brilliance of the diamond relative to a perfect Type IIa diamond.

Another approach that has been tried to alter the color of a natural type Ia diamond is to go to very high temperatures and pressures in the diamond stable region where nitrogen atoms are more mobile. For each 100° Centigrade increase in temperature, the mobility of nitrogen in diamond increases almost an order of magnitude. Evans, et al., Proc Roy Soc Lond, a 344, 111–130 (1975) and Bonzel, et al., Proc Roy Soc Lond, A 361, 109–127 (1978), annealed Type Ia diamonds containing nitrogen in the diamond stable region at temperatures above 1960° C. under stabilizing pressures as high as 85 kilobars (kbars); i.e., in the diamond stable region. The application of pressure is necessary to keep the diamond in the diamond-stable part of the Pressure-Temperature diagram of carbon. F. P. Bundy, Physica, A156, 169–178 (1989). Otherwise, exposure of diamond to such high temperatures would result in the rapid graphitization of the diamond. The diamond stable phase vs the graphite stable phase is generally accepted as being defined by the Simon-Berman line. The Simon-Berman line separates the diamond and graphite stable regions on the phase/temperature (P) plot. C. S. Kennedy and G. C. Kennedy in J. Geophysics Res, Vol. 81, pp. 2467–2469 (1976) define the Simon-Berman line by the equation:

$$P(\text{kilobars})=19.4+0.025T(\text{degrees Centigrade}).$$

Most of the diamonds that have been treated by Evans et al and Bonzel et al were of the type IaA/B, i.e., they had a mixture of nitrogen clusters comprised of either nitrogen pairs(A) or quadruples(B) since diamonds with either pure IaA or IaB characteristics are very rare. All of the diamonds contained platelets. In the diamonds with predominantly A clusters, the diamonds turned a yellow color as some of the clusters broke up and formed isolated nitrogen atoms (Type Ib). They were less successful in treating diamonds with predominantly B clusters which apparently are more stable than A clusters. The most attractive and deepest yellow colors were obtained with Type Ia diamonds at temperatures between 2250° and 2300° C. and 48 kilobars of pressure (Evans et al., supra.).

Although Evans and co-workers achieved a successful color change, both the Type Ia and IIa diamonds crumbled into small pieces. In other words, the operation was successful but the patient died. Nothing of economic value was created and any original value of the diamonds was destroyed by the treatment. Also, the requirement to operate in the diamond stable region of the carbon PT diagram necessitates extremely high pressures at the treatment temperatures involved. Such high pressures are either currently unattainable or are not economic. As a result of their work, high-pressure and high-temperature treatments of diamond to change their color were abandoned by the diamond research community in favor of irradiation and low-temperature annealing.

BRIEF SUMMARY OF THE INVENTION

The present invention is directed to a method for treating discolored natural diamonds, especially Type IIa diamonds and Type Ia diamonds with nitrogen as predominantly B centers, at pressures and temperatures in either the graphite-stable or diamond-stable region of the carbon pressure-temperature diagram to improve their color. The method includes cutting and polishing away surface imperfections and irregularities from a discolored natural diamond, placing said diamond in a pressure transmitting medium; i.e., a powder which is consolidated into a pill. Next, the pill is placed into a high pressure/high temperature (HP/HT) press at elevated pressure and elevated temperature within either the diamond-stable or the graphite-stable range of the carbon phase diagram for a time sufficient to improve the color of said diamond. Finally, the diamond is recovered from the press. Colorless Type Ia and IIa diamonds can be made by this method.

Typical temperatures range from about 1500° to about 3500° C. with corresponding pressures ranging from about 10 to about 100 kilobars, and preferably from about 20 to about 80 kilobars. Pressing times in the HP/HT press can range from as short as about 30 seconds up to as long as 96 hours or more, with pressing times preferably ranging from around 5 minutes up to 24 hours. These conditions (time, temperature, and pressure) are correlated and adjusted to the nature of the discoloring defects in the diamond which have to be altered in order to improve the color of the diamond.

Advantages of the present invention include the ability to upgrade the color of discolored or off-colored diamond to produce fancy color diamonds or colorless diamonds. Another advantage is to decrease the cracking and breakage of the diamonds and increase the overall yield of the process. Another advantage is the ability to maintain the mechanical and structural integrity of the color-improved diamonds. A further advantage is the specific ability to make colorless diamonds from Type IIa diamonds. A further advantage is the ability to retain the optical clarity of the treated diamonds disclosed herein. These and other advantages will be readily apparent from the disclosure set forth herein.

BRIEF DESCRIPTION OF THE DRAWINGS

For a fuller understanding of the nature and objects of the present invention, reference should be had to the following detailed description taken in connection with the accompanying drawings, wherein.

DETAILED DESCRIPTION OF THE INVENTION

The present invention is illustrated in connection with a conventional HP/HT apparatus which may be of the belt- or die-type described, for example, in U.S. Pats. Nos. 2,947,611; 2,941,241; 2,941,248; 3,609,818; 3,767,371; 4,289,503; 4,673,414; and 4,954,139. However, it will be appreciated that the method of the present invention will find applicability in any HP/HT apparatus which is capable of providing the required HP and HT conditions simultaneously. Accordingly, it is intended that such other HP/HT apparatuses are within the scope of the invention herein described.

Figure 1:
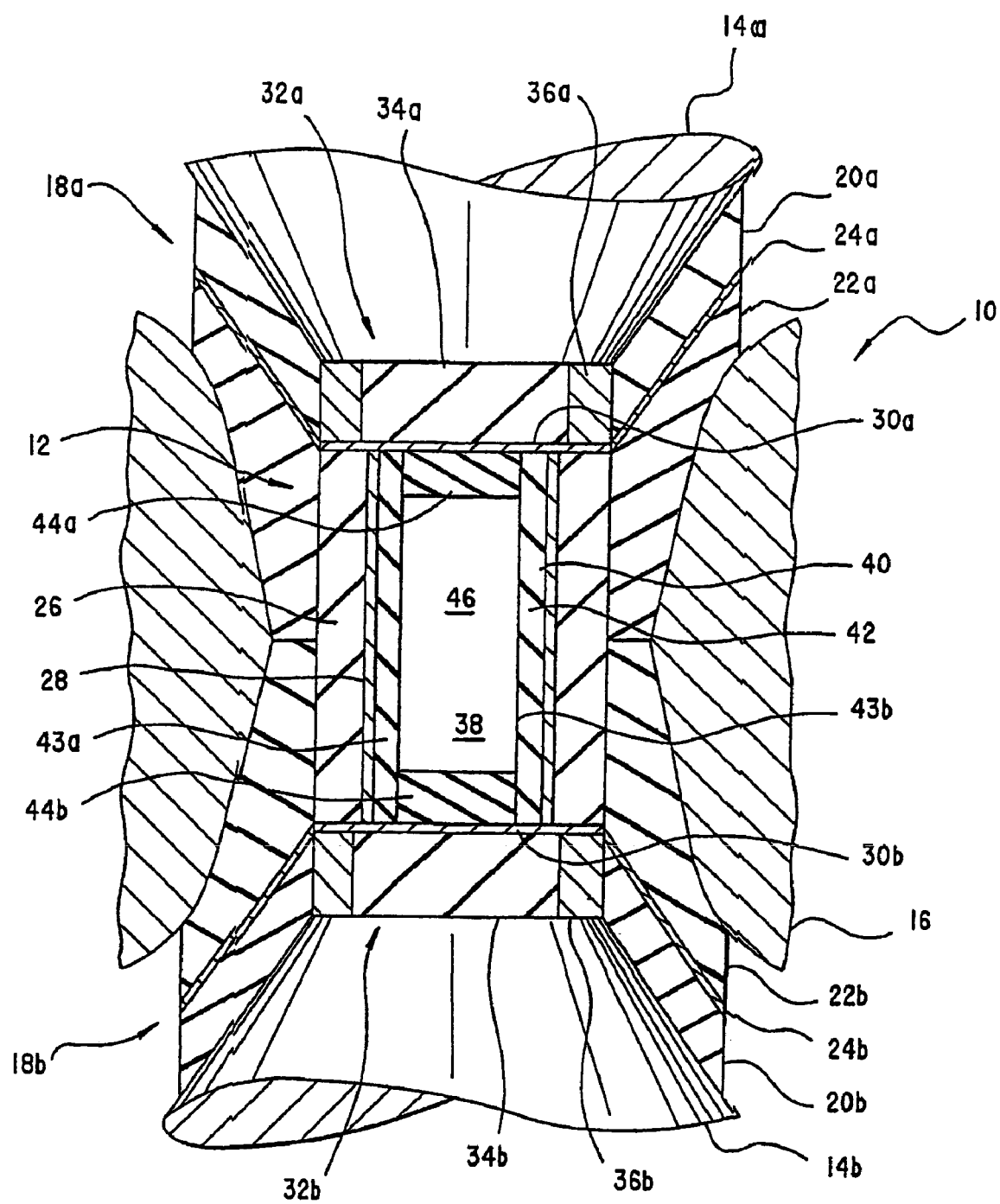
FIG. 1 is a cross-sectional view of a conventional HP/HT apparatus which may utilized to anneal discolored diamond for improving their color.

Looking then to FIG. 1, an illustrative HP/HT apparatus useful in the practice of the present invention is shown generally at 10 to comprise a generally cylindrical reaction cell assembly 12 interposed between a pair of punches, 14a and 14b, and surrounded by a generally annular belt or die member 16. Preferably, both punches 14 and belt member 16 are formed of a relatively hard material, such as cemented tungsten carbide. Between punches 14 and belt member 16 are a pair of insulating assemblies, 18a and 18b, each of which is formed of a pair of thermally- and electrically-insulating members, 20a–b and 22a–b, each preferably formed of pyrophyllite or the like, and having an intermediate metallic gasket, 24a and 24b, disposed there between.

As shown, reaction cell assembly 12 includes a hollow cylinder 26, which may be formed of a material, such as salt or the like, which is converted during HP/HT by phase transformation or compaction to a stronger, stiffer state or, alternatively, of a talc material or the like which is not so converted. In either case, the material of cylinder 12 is selected as being substantially free of volume discontinuities or the like, under HP/HT as may occur, for example, with pyrophyllite or alumina materials. Materials meeting such criteria are described in U.S. Pat. No. 3,030,662.

Positioned concentrically within salt cylinder 26 is an adjacent cylinder 28, which is provided as a graphite electrical resistance heater tube for providing indirect heating. Electrical connection with heater tube 28 is achieved via an adjacent pair of conductive-metal end discs, 30a and 30b, which are axially-disposed with respect to heater tube 28. Adjacent each disc 30 is provided an end cap assembly, shown generally at 32a and 32b, each of which comprises an insulating plug, 34a and 34b, surrounded by an electrically conductive ring, 36a and 36b.

It will be appreciated that the interior of heater 28, along with end discs 30, salt cylinder 26, and end cap assemblies 32, defines a generally-cylindrical inner chamber, shown at 38, having defined axial and radial extents and containing a pressure transmitting medium 40. Pressure transmitting medium 40 is selected as having a relatively low coefficient of internal friction to make it semi-fluid at HP/HT conditions, and may be provided as a cylindrical salt liner 42, which defines radial pressure transmitting medium layers 43a and 43b, and is fitted with an axial pair of salt plugs, 44a and 44b, each of which defines an axial pressure transmitting medium layer. Preferably, salt liner 42 and plugs 44 are formed of a graphite material or of sodium chloride, but also may can be formed of any chloride, iodide, or bromide of sodium, potassium or calcium or a mixture thereof. Alternatively, pressure transmitting medium 40 may be provided in powdered or particulate form. In either case, medium 40 defines a cavity space, as is shown at 46, which is configured to receive the discolored diamond to be annealed. Such is the configuration of a representative HP/HT apparatus for practicing the present invention.

Material is desirably removed from the natural diamond to be annealed in an amount sufficient to desirably reduce surface and near-surface imperfections and nonuniformites and/or to give the stone a more streamline shape. Material removal may be performed by cutting, shaping, and/or polishing. Cutting and shaping techiques include laser cutting and removing a portion of the stone by fracturing the stone. The surface and near-surface imperfections and non-uniformities which are desirable reduced include inclusions intersecting the external surface of the diamond, near-surface inclusions, cracks or gletzs intersecting the surface, near-surface cracks or gletzs, surface protuberations, surface concavities, near-surface voids, surface or near-surface regions of impurity inhomogeneities and surface or near-surface plastic deformation zones. Surface imperfections and non-uniformities may cause crack propagation or even cause breakage of the stone during treatment. The object of preshaping or preblocking (in the diamond trade shaping the diamond by cutting is called "blocking") the natural diamond before annealing is to prevent it from breaking or cracking during the HP/HT process. It is also desirable to shape the stone in such a manner so as to give it a more streamline appearance. A more streamline shape may reduce breakage and cracking during high pressure compaction when the stone is under compression and during withdrawal of the stone when the stone is under tension due to movement of the punches 14 in opposite directions away from each other.

In departing from conventional uses of HP/HT apparatuses, the preblocked diamond is placed within a powdered pressure transmitting medium which then is consolidated or densified to in excess of 90% of its theoretical density to form a pill. The pill medium must transmit hydrostatic pressure without loss as a continuum onto diamond surfaces in the HP/HT apparatus to minimize shear stresses that could plastically deform or stress the diamond being treated. When using any solid pill medium or any pill medium that is solid at some time during the HP/HT process, it is impossible to eliminate all shear and/or tensile stresses during the process. The diamond can be cracked when pressure is first applied, during the annealing process at high temperatures or even during the cooling down from high temperatures as the pressure in the cell is returned to atmospheric pressure. In the latter case, the pressure in the cell is relieved by withdrawing the opposing anvils or punches 14a, 14b. The top and bottom faces of the pill tend to ballon outwards as the anvils are withdrawn. Since the concentric belt is rigid, the pressure is initially only relieved along one axis (the anvil translation axis) which causes shear and tensile stresses to develop in the pill medium. The pill medium is usually solid at this point in the process cycle and can thus transmit these shear and tensile stresses to the diamond. It is not uncommon for a diamond with a grippable unblocked surface to break apart in a plane perpendicular to the anvil translation axis during pressure relief of the cell.

The transmission of any remanent shear/tensile stresses from the pill medium into the diamond can be minimized by the preblocking or preshaping of the diamond. Preblocking produces a diamond shape whose surface is difficult to grip by the pill medium. Therefore, tensile/shear stresses in the pill medium tend to be relieved at the diamond-medium interface because the preblocked diamond has a slippery shape that is difficult find a hold on. In addition, removal of cracks, gletzes, inclusions and any other imperfections generating internal stresses, e.g. inclusions, or magnifying externally applied stresses, e.g. cracks, in the diamond minimizes internal stresses in the diamond that might cause it to deform, crack or shatter. In a typical preblocking operation, two to twenty-five facets may be cut and/or polished on the diamond surface. The number and size of the facets depend on the number of surface and near-surface imperfections as well as the morphology, the profile, the overall size and the purchase value and the estimated post-process value of the diamond. Because preblocking adds another expense to the overall decoloration process, the amount of preblocking is determined not only by the physical characteristics of the natural diamond but also by the estimated profit margin process. For example, it is economic to do more preblocking on larger more expensive diamonds than on smaller less expensive diamonds.

By way of additional explanation, it is desirable to remove sufficient material from the natural diamond for reducing compressive stresses during compression of the stone during HP/HT treatment as well for reducing tensile stresses during removal or withdrawal of the diamond when the punches 14a and 14b move away from each other. The punches 14a and 14b move along a longitudinal axis (not shown) toward or away from each other to cause the respective compressive or tensile stress on the diamond. A streamlining of the diamond along a longitudinal axis may be enhanced by removing protruberances that project outwardly from the exterior surface of the diamond. This type of removal reduces a cross sectional area in a direction normal to the longitudinal axis for enhancing the streamline effect. The streamline effect may be enhanced by forming smooth surfaces with a generally arcuate shape such as by increasing the number of facets. The ends of the diamond aligned along the longitudinal axis may be reduced in size to enhance the smoothing effect. The diamond may be conviently loaded into the pill so that the smallest cross sectional area faces the longitudinal direction. It is desirable to shape and position the diamond in such a manner so as to reduce stresses on the diamond during treatment.

The pill medium must be thermally and chemically stable, and preferably should not react with or cause dissolution of diamond. Suitable media are stable fluids or gases at annealing conditions or highly plastic solids, including, but not limited to, salts such as describe above, oxides such as magnesium oxide or calcium oxide, or carbons such as graphite. The pill medium also must be scaleable to the high pressures and high temperatures that are encountered with the HP/HT apparatus. Finally, the pill medium must possess a volume compressibility which is small and comparable to the gasketing system, i.e., it must be void-free and close to its theoretical lattice density at annealing conditions. Multiple pills can be housed within cavity 46 if necessary, desirable, or convenient.

Pressure conditions for the present invention comprehend conditions in the graphite stable region of the PT diagram, typically in the range of from about 10 to about 200 kilobars, and preferably from about 20 to about 80 kilobars. Temperatures employed in the practice of the present invention typically are in the range of from about 1500° to about 3500° C. Annealing conditions depend upon the nature of the defect in the diamond which have to be removed or changed to improve color and can readily be determined by those skilled in the art without undue experimentation.

HP/HT conditions are maintained for a time adequate for the color of the discolored diamond to improve. Such times can range from several minutes to several hours, preferably, from about 5 minutes to 24 hours, and more preferably, from about 5 minutes to about 1 hour. In this regard, the discolored diamond can be subject to multiple annealing steps at the same or at different conditions, as the examples will demonstrate.

Discolored diamonds subjected to the inventive process may have been previously cut and polished and sold as finished diamonds. The process yield of these precut/polished diamonds can still be increased by preblocking them if they contain surface or near-surface imperfections of the type mentioned above. After processing, the decolored diamonds are cut and polished in the same manner as other natural diamonds. Thereafter, the diamond is ready for use in jewelry or fabrication into devices, such as, for example, heat sinks, optical windows, or the like. Of special importance is the ability of the present invention to convert discolored Type IIa diamond into a colorless stone. However, the present invention can also produce blue, pink, green, yellow and yellowish green diamonds.

The following examples show how the present invention has been practiced, but should not be construed as limiting. In this application, all units are in the metric system, unless otherwise stated. All patents and publications referred to herein are expressly incorporated herein by reference.

EXAMPLES

In the examples, annealing of natural diamonds was done under high temperature and high pressure conditions using a belt type apparatus which is capable of reaching very high pressures (~60 kbars) and temperatures (~2600° C.). Diamond annealing in accordance with the present invention is illustrated in the examples using the following cell arrangements and operating conditions.

Figure 2:
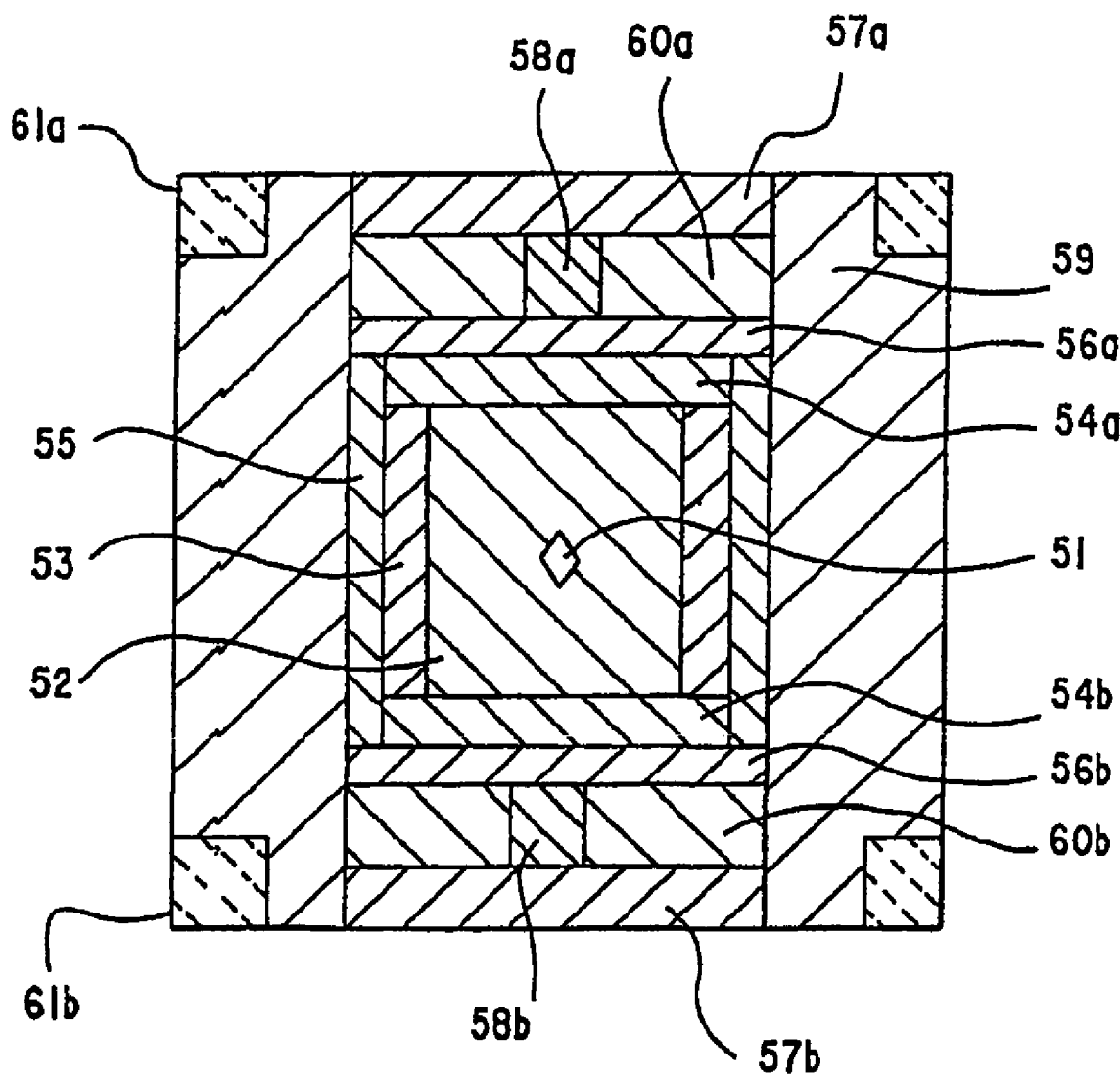
FIG. 2 is a cross-sectional view of a typical reaction cell for annealing natural diamond in the apparatus in FIG. 1.

The reaction cell assembly is schematically shown in FIG. 2. A preblocked diamond crystal 51 is placed inside cylindrical pill 52 which is made of high purity graphite or sodium chloride powder. The diamond crystal 51 is preblocked to remove material by laser. Graphite is preferred because it does not melt during high temperature annealing. Pill 52 has the following dimensions: diameter of 0.76 inches (19.3 mm) and height of 0.86 inches (21.8 mm). Pill 52 is made by compacting the graphite powder and diamond crystal 51 in a hydraulic press. Pill 52 is placed within magnesium oxide tube 53 which is fitted with end discs 54a and 54b. This assembly, then, is placed within graphite tube 55 which is fitted with end discs 56a and 56b. Such assembly is placed within salt cylinder 59 whose ends are fitted with graphite pins 58a and 58b surrounded by, respectively, salt cylinders 60a and 60b. Graphite discs 57a and 57b, respectively, seal the ends of salt cylinder 59.

The reaction cell assembly then is placed inside a high pressure apparatus (such as a belt-type apparatus) using standard gasket assemblies to form a seal at high pressure and to make electrical contact with the punches so that it can be heated with electrical power.

A typical annealing run starts with the reaction cell being pressurized to a set pressure of ~60 kbars. The electrical power is turned on when the pressure reaches ~96% of the set pressure. Initially, the diamond is heated to approximately 1200° C. and held at this temperature for one minute. Thereafter, the temperature is increased to the set value, e.g., approximately 2500° C., in 2.5 minutes and held at the set value for 18 minutes. The temperature should remain steady at 2500 C during the last 6 minutes. Then the power is slowly reduced to nil in 1.5 minutes. The cell pressure is held constant for about 1 minute and the pressure then slowly released. The reaction cell is removed from the HP/HT apparatus and the graphite pill containing the diamond is removed. The diamond is recovered by digesting the pill in a boiling mixture of 90% sulfuric acid and 10% nitric acid.

Example I

A preblocked Type IIa natural rough diamond weighing 3.49 carats and being brown in color was embedded inside a graphite pill made by pressing high purity graphite powder. The diamond was annealed at ~60 kbars and 2450° C. for 6 minutes. The diamond crystal was recovered and visual examination showed that its color had changed to clear or colorless.

Example II

A preblocked Type IIa natural polished diamond weighting 3.29 carats and brown in color was placed inside a pill made by pressing high purity sodium chloride powder. The diamond was annealed at ~60 kbars and ~2500° C. for 6 minutes. Visual examination of the recovered diamond showed that the color had changed to clear or colorless.

Example III

A preblocked type Ia natural rough diamond weighing 2.46 carats and brown in color was placed inside a pill made by pressing high purity graphite powder. The diamond was annealed at ~60 kbars and ~2550° C. for ~8 minutes. Visual examination of the recovered diamond showed that color had changed to intense yellow. The spectrum of this stone in the UV, visible, near infrared, and infrared showed no unusual absorption lines that are not seen in natural untreated diamonds. Specifically, the normal irradiation signatures, such as the GR1 line at 741 nm and the H1b and H1c lines arising from a combination of irradiation and heat treatment were absent.

Example IV

A a preblocked Type Ia natural rough diamond weighing 1.79 carats and brown in color was placed inside a pill made by pressing high purity graphite powder. The diamond was annealed at ~60 kbars and 2500° C. for ~8 minutes which resulted in a change in color to greenish golden yellow. The spectrum of this stone in the UV, visible, near infrared, and infrared spectra showed no unusual absorption lines that are not seen in natural diamond stones. Specifically, the normal irradiation signatures, such as the GR1 line at 741 nm and the H1b and H1c lines arising from a combination of irradiation and heat treatment were absent.

Example V

A preblocked type IIa natural rough diamond weighing 3.06 carats and brown in color was placed inside a pill made by pressing high purity graphite. The diamond was annealed at ~60 kbars and 2300° C. for ~6 minutes. Visual examination of the recovered diamond showed that the color had changed to pink.

Example VI

A preblocked type IIa natural polished diamond weighing 1.40 carats and brown in color was placed inside a pill made by pressing high purity graphite. The diamond was annealed at ~60 kbars and 2500° C. for ~6 minutes. Visual examination of the recovered diamond showed that the color had changed to light pink.

We claim:

1. A method for changing the color of brownish natural diamond, comprising:
   a) blocking a brownish natural diamond to streamline a shape of the natural diamond;
   b) placing said streamlined natural diamond in a pressure transmitting medium;
   c) consolidating said pressure transmitting medium into a pill;
   d) exposing said pill to elevated pressure and elevated temperature within the graphite-stable range or within the diamond forming range of the carbon phase diagram for a time sufficient to change the color of said diamond; and
   e) recovering said diamond.

2. A method of claim 1 wherein the blocking step removes at least one of surface imperfections, surface nonuniformities, near-surface imperfections and near-surface non-uniformities of the natural diamond.

3. A method of claim 2 wherein said blocking step comprises cutting.

4. A method of claim 2 wherein said blocking step comprises polishing.

5. A method of claim 2 wherein said blocking step comprises cutting and said cutting produces at least two facets on said diamond.

6. A method of claim 2 wherein said exposure to elevated pressure comprises transmitting pressure to said pill through opposing punches and creating compressive stresses, said recovering of said diamond includes withdrawing said opposing punches wherein said withdrawal of said punches creates tensile stresses in said diamond, said natural diamond being shaped by removing material for reducing said stresses.

7. A method of claim 2 wherein said brownish natural diamond is a Type Ia or Type Ib diamond.

8. A method of claim 2 wherein said brownish natural diamond is a Type IIa or Type IIb diamond.

9. A method of claim 2 wherein the recovered diamond is colorless.

10. A method of claim 2 wherein the recovered diamond is colored.

11. A method of claim 2 wherein said elevated temperature ranges from about 1500° to 3500° C. and said elevated pressure ranges from about 10 to about 100 kilobars.

12. A method of claim 11, wherein said elevated pressure ranges from about 20 to about 80 kilobars.

13. A method of claim 2 wherein said recovered diamond is subjected to step (c) a plurality of times.

14. A method of claim 2 wherein said pressure transmitting medium is thermally and chemically stable at HP/HT and is selected from the group consisting of a salt, an oxide, or graphite.

15. A method of claim 2 wherein said pressure transmitting medium is a salt selected from the group consisting of sodium chloride, sodium iodide, sodium bromide, potassium chloride, potassium iodide, potassium bromide, calcium chloride, calcium iodide and calcium bromide.

16. A method of claim 15 wherein said pressure transmitting medium is selected from the group consisting of magnesium oxide, calcium oxide, and mixtures thereof.

17. A method of claim 15 wherein said pressure transmitting medium is graphite.

18. A method of claim 2 wherein said elevated temperature and elevated pressure are maintained from 30 seconds to 96 hours.

19. A method of claim 2 wherein said elevated temperature and elevated pressure are maintained from 5 minutes to 24 hours.

20. A method of claim 2 wherein said elevated temperature and elevated pressure are maintained from about 5 minutes to about 1 hour.

21. A method of claim 2 wherein said blocking consists of cutting from 1 to 100 cut facets on the surface of said diamond.

22. A method for changing the color of a brownish natural diamond, comprising the sequential steps of:
   a) reshaping said natural diamond by removing material from said diamond;
   b) placing said natural diamond in a pressure transmitting medium;
   c) subjecting said pressure transmitting medium containing said natural diamond to a sufficiently high pressure and high temperature for a time sufficient to change the color of said diamond to colorless or a fancy color; and
   d) recovering said diamond.

23. The method of claim 22, wherein said pressure transmitting medium containing said natural diamond is subject to a pressure ranging from about 10 to 100 kilobars.

24. The method of claim 22, wherein said pressure transmitting medium containing said natural diamond is subject to a temperature in the range of about 1500° C. to 3500° C.

25. The method of claim 22, wherein said pressure transmitting medium containing said brownish natural diamond is subject to a sufficiently high temperature and sufficiently high pressure for about 30 seconds to about 96 hours.

* * * * *

UNITED STATES PATENT AND TRADEMARK OFFICE
CERTIFICATE OF CORRECTION

PATENT NO. : 7,241,434 B2 Page 1 of 1
APPLICATION NO. : 10/344249
DATED : July 10, 2007
INVENTOR(S) : Thomas R. Anthony et al.

It is certified that error appears in the above-identified patent and that said Letters Patent is hereby corrected as shown below:

On the title page before item (86) insert, Related U.S. Application Data (63) National Phase of PCT/US01/24707 filed 08/08/2001 claiming priority to 60/224,485 filed 08/11/2000.

Signed and Sealed this

Sixth Day of November, 2007

JON W. DUDAS
*Director of the United States Patent and Trademark Office*